United States Patent
Schorn

(10) Patent No.: US 6,726,737 B2
(45) Date of Patent: Apr. 27, 2004

(54) AIR FILTER ARRANGEMENT FOR A MULTI-CYLINDER COMBUSTION ENGINE

(75) Inventor: Juergen Schorn, Rutesheim (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 23 days.

(21) Appl. No.: 09/946,178

(22) Filed: Sep. 5, 2001

(65) Prior Publication Data

US 2002/0033010 A1 Mar. 21, 2002

(30) Foreign Application Priority Data

Sep. 5, 2000 (DE) .......................................... 100 43 532

(51) Int. Cl.$^7$ .............................................. B01D 46/00
(52) U.S. Cl. ........................ 55/385.3; 55/492; 55/505; 55/524; 123/198 E
(58) Field of Search .......................... 55/320, 327, 336, 55/385.3, 486, 487, 492, 505, 511, 524, 309, 418, DIG. 28; 123/198 E; 180/219, 225, 68.6, 68.4, 69.24, 84, 89.17

(56) References Cited

U.S. PATENT DOCUMENTS

| | | | | |
|---|---|---|---|---|
| 2,614,654 A | * | 10/1952 | Strinden ..................... | 55/385.3 |
| 3,293,830 A | * | 12/1966 | McKinlay .................. | 55/385.3 |
| 3,849,093 A | * | 11/1974 | Konish et al. ............. | 55/385.3 |
| 4,197,922 A | | 4/1980 | Weber et al. | |
| 4,459,966 A | | 7/1984 | Sakano et al. | |
| 4,726,328 A | * | 2/1988 | Takeda et al. .......... | 123/198 E |
| 4,897,097 A | | 1/1990 | Yamamura | |
| 5,391,212 A | * | 2/1995 | Ernst et al. ................ | 55/385.3 |
| 5,609,658 A | * | 3/1997 | Takemura et al. ......... | 55/385.3 |
| 5,725,624 A | | 3/1998 | Ernst et al. | |
| 5,891,207 A | * | 4/1999 | Katta ........................ | 55/385.3 |
| 5,901,681 A | * | 5/1999 | Mueller .................. | 128/198 E |
| 6,251,151 B1 | * | 6/2001 | Kobayashi et al. ..... | 128/198 E |
| 6,409,783 B1 | * | 6/2002 | Miyajima et al. ....... | 128/198 E |

FOREIGN PATENT DOCUMENTS

| | | |
|---|---|---|
| DE | 1273901 | 7/1968 |
| DE | 29806916 | 9/1998 |
| EP | 0242797 A1 | 10/1987 |
| EP | 0242797 B1 | 12/1990 |
| EP | 0456957 | 11/1991 |
| FR | 2385906 | 10/1978 |

OTHER PUBLICATIONS

Search Report.

* cited by examiner

Primary Examiner—Minh-Chau T. Pham
(74) Attorney, Agent, or Firm—Crowell & Moring LLP

(57) ABSTRACT

An air filter arrangement is suitable for a combustion engine that is built into a motor vehicle. The combustion engine has opposite rows of cylinders and its air filter device includes an air filter housing that receives an air filter and has two inlet connection pieces. To optimize the air filter arrangement, the inlet connection pieces are connected to the raw air chambers of the air filter housing, which are connected with a clean air chamber via the air filters. A feeder line is run to the combustion engine from that clean air chamber. The raw air chambers are disposed closer to the engine than the clean air chamber.

6 Claims, 2 Drawing Sheets

AIR FILTER ARRANGEMENT FOR A MULTI-CYLINDER COMBUSTION ENGINE

This application claims the priority of German Patent Document 100 43 532.7, filed in Germany, Sep. 5, 2000, the disclosure of which is expressly incorporated by reference herein.

BACKGROUND AND SUMMARY OF THE INVENTION

This invention relates to an air filter arrangement for a multi-cylinder combustion engine to drive a motor vehicle, preferably with opposite rows of cylinders.

A known air suction system, European Patent Document EP 0 456 957 A1, comprises a housing that, with housing segments, runs along a front and longitudinal sides of a combustion engine that has opposite rows of cylinders. The two housing segments of the air suction system, which are arranged adjacent to the longitudinal sides of the combustion engine, are provided with suction lines to whose free ends air filters are attached.

French Patent Document FR 2 385 906 (corresponding U.S. Pat. No. 4,197,922 deals with an air filter with a housing for a combustion engine into which is integrated a suction noise absorber. The housing is provided with two funnel-shaped, horizontally aligned suction intakes that empty into the annular chambers of the housing. A comparable design is shown in EP 0 242 797 B1; of course, the suction intakes are equipped with control flaps there.

An object of the invention is to provide an air filter arrangement for a combustion engine that can be installed in a motor vehicle and that, in particular, will be optimized regarding throughflow, space requirement and acoustics.

This object is achieved according to the invention by providing an air filter arrangement for a multicylinder combustion engine to drive a motor vehicle, with opposite rows of cylinders, that has an air filter housing with two inlet connection pieces and that receives an air filter, wherein the inlet connection pieces are connected to raw air chambers of the air filter housing, which are connected with a clean air chamber via interspersed air filters, from which clean air chamber there is provided a feeder line to the combustion engine.

Other features of preferred embodiments of the invention are described herein and in the claims.

An important advantage to be achieved with the help of the invention is to be seen in the following: The air filter arrangement, assuming a corresponding design of a motor vehicle between a superstructure and a combustion engine without impairing the free shaping of the latter, can be arranged in a spatially favorable manner. The air filter arrangement can be specifically coordinated in acoustic terms in a simple manner. Advantageous air conduction is also made possible by the fact that the air is moved with throughflow—with comparatively low counterpressure—of the air filters from the raw air chambers into the clean air chamber and from there into the feeder line that is connected with the combustion engine. This air conduction is also supported by the arrangement and design of the two inlet connection pieces and the feeder line. Moreover, on the basis of its structural design, the air filter housing permits a series of solutions, including those of an aesthetic kind. Finally, considering the space conditions, the air filters can be optimized regarding the air filter surface and their integration into the connection devices represents an excellent solution.

Other objects, advantages and novel features of the present invention will become apparent from the following detailed description of the invention when considered in conjunction with the accompanying drawings.

DETAILED DESCRIPTION OF THE DRAWINGS

Figure 1:
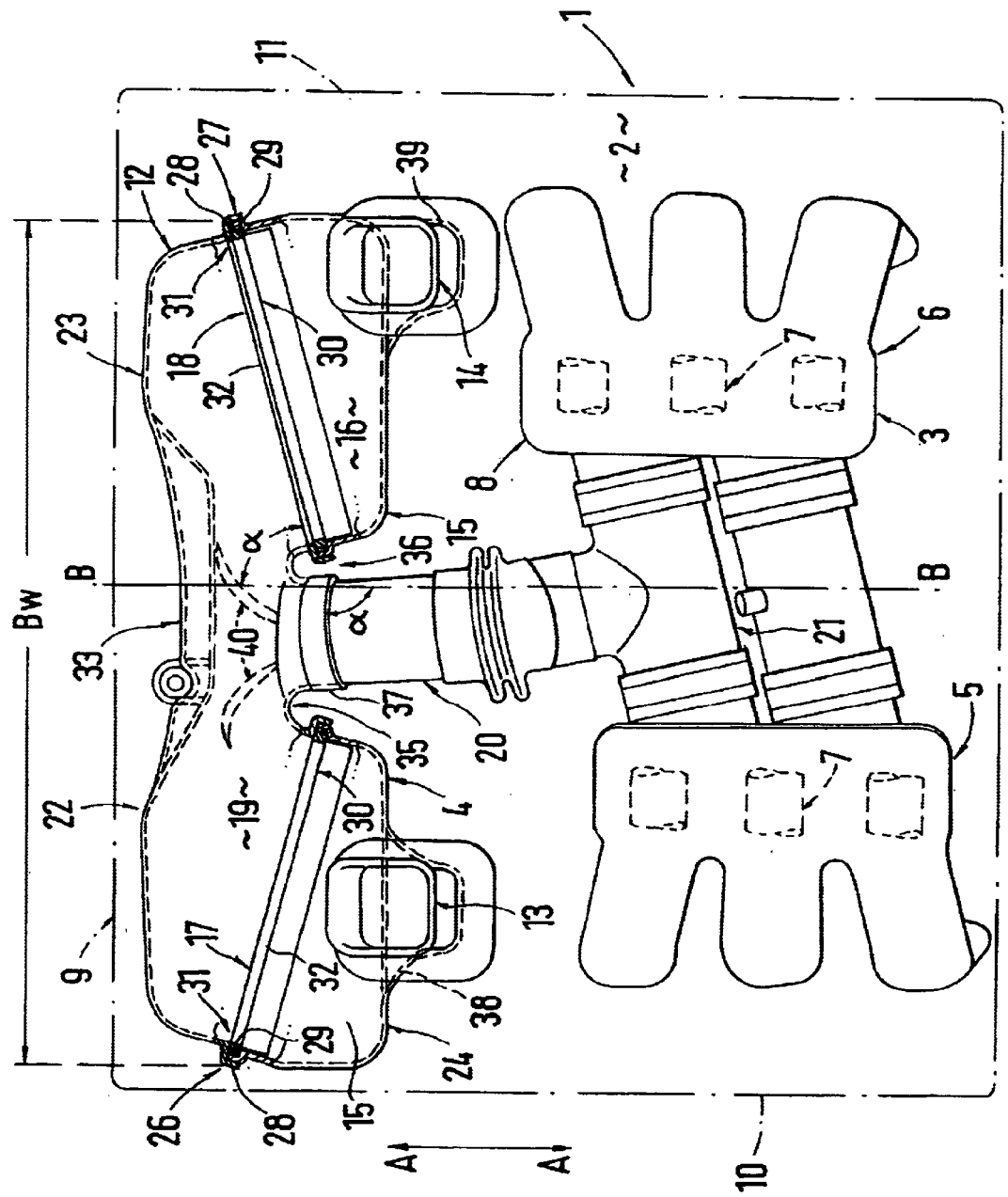
FIG. 1 is a top schematic view of a combustion engine with the invention-based air filter arrangement built into a motor vehicle; constructed according to a preferred embodiment of the present invention.
Figure 2:
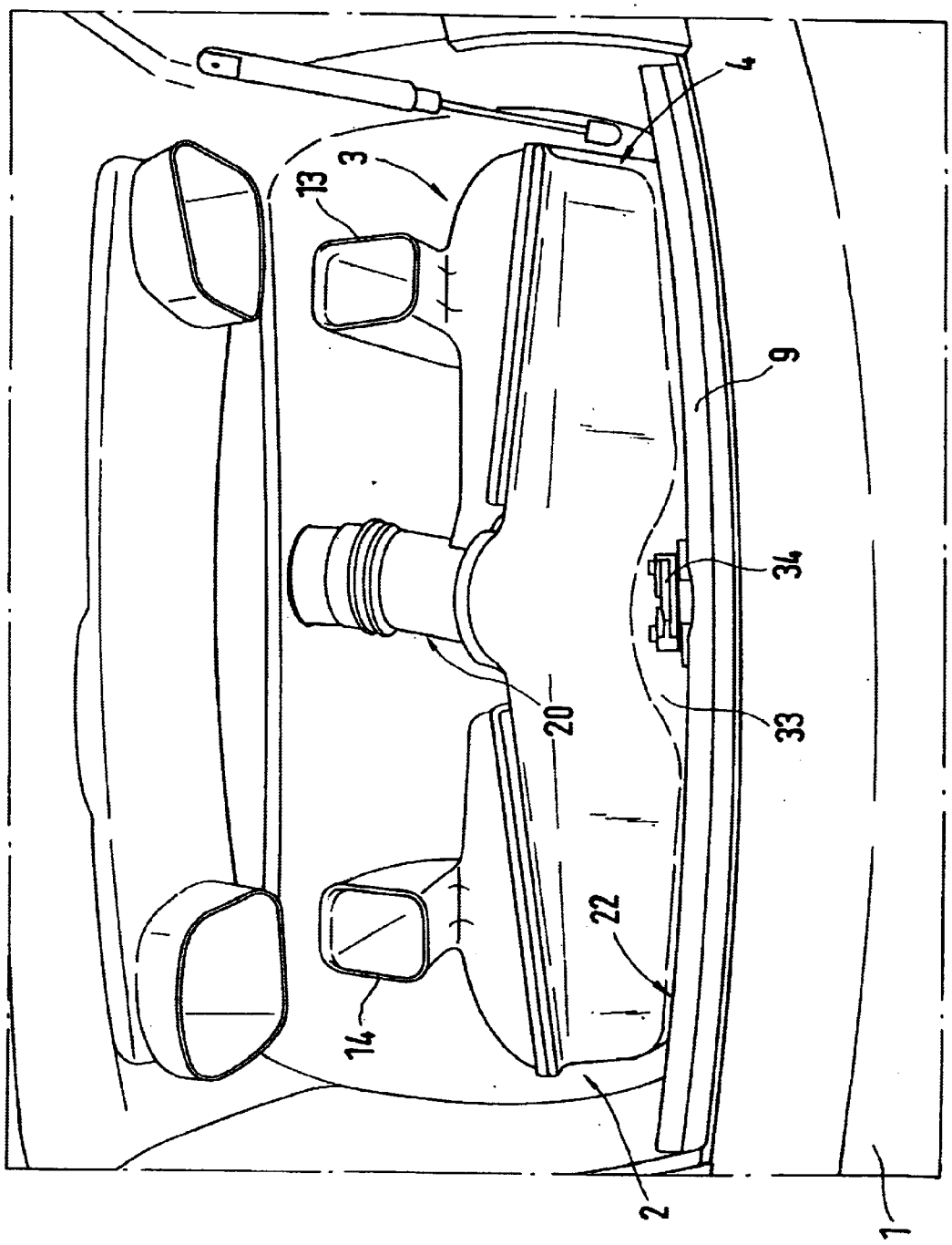
FIG. 2 is an oblique view from above, specifically as viewed from one end of the motor vehicle showing the arrangement of FIG. 1.

Looking at a motor vehicle 1, there is shown only an aggregate unit compartment 2 in which is housed a combustion engine 3. Combustion engine 3, provided with an air filter arrangement 4, is of the lifting distance cylinder design type and comprises opposite cylinder rows 5, 6, each with several cylinders 7, which cylinder rows 5, 6 are arranged in V-shape or opposite each other. The air filter arrangement 4 is placed between a front 8 of combustion engine 3 as well as a terminal limitation 9 of the aggregate unit space 2, which limitation extends laterally with respect to the longitudinal direction of the vehicle A—A and which, for example, spans an essential width of aggregate unit space 2 or between aggregate unit limitations 10 and 11 that are aligned in the longitudinal direction of the vehicle A—A. An air filter housing 12 of the air filter arrangement 4 made of plastic, metal or the like is provided with inlet connection pieces 13, 14 that are attached, standing upright, upon said air filter housing 12 on both sides of a longitudinal midplane B—B of the combustion engine 1 that approximately includes the longitudinal midplane of the vehicle. The inlet connection pieces 13, 14 are connected to raw air chambers 15, 16 that are connected with a clean air chamber 19 with air filters 17, 18 connected in between. From clean air chamber 19, there is placed a feeder line 20 that extends in the longitudinal midplane B—B or at least adjacent to it and that leads to combustion engine 1 or a distributor line 21 that works between cylinder rows 5, 6. Air filter housing 12 is so shaped that the raw air chambers 15, 16 with inlet connection pieces 13, 14 face toward the front 8 and that clean air chamber 19 extends on a side 22 that faces away from front 8.

The air filter housing 12 is formed by a first housing shell 23 for a clean air chamber 19 and a second housing shell 24 as well as a third housing shell 25 for raw air chambers 15, 16. The second and third housing shells 24, 25 are connected with the first housing shell 23 via connecting devices 26, 27. Each connecting device, has an overlapping flange 28 and an undergrasping flange 29 that form a recess 30 for air filters 15, 16. In other words, flanges 27, 28 form a duct-like inward molding 31 that keeps a circulating retainer rim 32 in a form-locking position, said rim being placed on the outer circumference of the particular air filter.

The first housing shell 23 is provided with respect to limitation 9 with a molding 33 for accessory parts 34—in this case a lock—in the aggregate unit compartment 2. An additional molding 35 can be found on the first housing shell 23 at point 36 to form a connecting piece 37 for the feeder line 20. Provided on the second housing shell 24 and the third housing shell 25 are outward moldings 38, 39 for inlet connection pieces 13, 14, said outward moldings bringing about the defined flow developments to the upright air filters 15, 16, which extend at an obtuse angle with respect to the longitudinal midplane B—B. Besides, air conduction elements 40 are provided in clean air chamber 18 of the first housing shell 22; they control the air flow coming from air filters 15, 16 so that they will be directed into the feeder line 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Air filter arrangement for a multicylinder combustion engine to drive a motor vehicle, with opposite rows of cylinders, that has an air filter housing with two inlet connection pieces and that receives an air filter, wherein the inlet connection pieces are connected to raw air chambers of the air filter housing, which are connected with a clean air chamber via interspersed air filters from which clean air chamber there is provided a feeder line to the combustion engine, wherein the raw air chambers with inlet connection pieces extend along a side facing toward the combustion engine and the clean air chamber extends on a side facing away from the combustion engine, and wherein inlet connection pieces are attached outside a longitudinal midplane of the combustion engine upon the air filter housing.

2. Air filter arrangement for a multicylinder combustion engine to drive a motor vehicle, with opposite rows of cylinders, that has an air filter housing with two inlet connection pieces and that receives an air filter, wherein the inlet connection pieces are connected to raw air chambers of the air filter housing, which are connected with a clean air chamber via interspersed air filters from which clean air chamber there is provided a feeder line to the combustion engine, wherein the raw air chambers with inlet connection pieces extend along a side facing toward the combustion engine and the clean air chamber extends on a side facing away from the combustion engine, and wherein the feeder line runs at least adjacent to a longitudinal midplane of the combustion engine.

3. Air filter arrangement for a multicylinder combustion engine to drive a motor vehicle, with opposite rows of cylinders, that has an air filter housing with two inlet connection pieces and that receives an air filter, wherein the inlet connection pieces are connected to raw air chambers of the air filter housing, which are connected with a clean air chamber via interspersed air filters from which clean air chamber there is provided a feeder line to the combustion engine, wherein the raw air chambers with inlet connection pieces extend along a side facing toward the combustion engine and the clean air chamber extends on a side facing away from the combustion engine, and wherein the air filters extend along an obtuse angle with respect to the longitudinal midplane of the combustion engine.

4. Air filter arrangement according to claim 3, wherein the air conduction elements are arranged adjacent to the feeder line.

5. Air filter arrangement according to claim 4, wherein the air conduction elements are arranged adjacent to the feeder line.

6. Air filter arrangement for a multicylinder combustion engine to drive a motor vehicle, with opposite rows of cylinders, that has an air filter housing with two inlet connection pieces and that receives an air filter, wherein the inlet connection pieces are connected to raw air chambers of the air filter housing, which are connected with a clean air chamber via interspersed air filters from which clean air chamber there is provided a feeder line to the combustion engine, wherein the raw air chambers with inlet connection pieces extend along a side facing toward the combustion engine and the clean air chamber extends on a side facing away from the combustion engine, and wherein air conduction elements are provided in the clean air chamber.

* * * * *